United States Patent Office 3,315,694
Patented Apr. 25, 1967

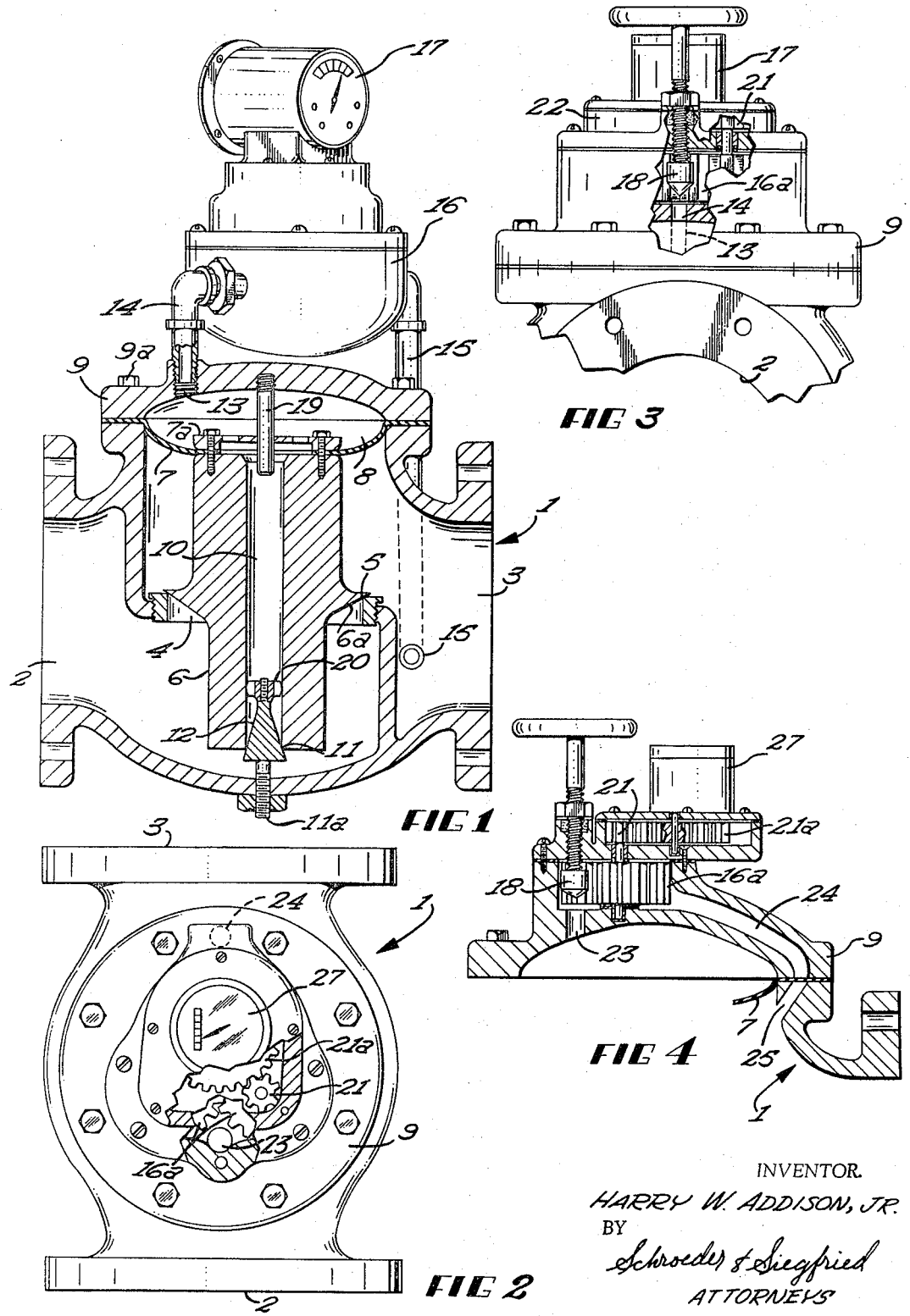

3,315,694
PILOT OPERATED METERING DEVICE
Harry W. Addison, Jr., 206 W. Marshall,
Marshall, Minn. 56258
Filed Feb. 11, 1964, Ser. No. 343,983
14 Claims. (Cl. 137—110)

This invention relates to a pilot operated metering apparatus and more particularly to an improved flow divider and measuring valve of the pilot operated type which may be used as a self-contained regulating valve or a remotely or manually controlled piloted valve with measurement of flow therethrough.

While piloted valves, flow dividing valves, and flow measuring apparatus are well recognized and in use, this invention is directed to an improved combination of a pilot operated metering apparatus by means of which flow through a valve may be measured in a diverting valve arrangement, such that a minor flow through a portion of the diverting valve will be proportional to total flow through the main valve and a measurement of the same may be simply made. This improved diverting and measuring valve is pilot operated to permit its application as a regulating valve or a remotely controlled valve to provide for numerous control and measurement functions. This improved valve metering apparatus is relatively simple in design, compact in structure and inexpensive to manufacture, thereby making it applicable for numerous measurement and control functions.

It is therefore an object of this invention to provide an improved pilot operated metering apparatus which utilizes a diverting valve and a pilot operated valve in combination with a measurement apparatus.

Another object of this invention is to provide a metering apparatus of this type which is simple in design, compact in structure and inexpensive to manufacture.

A further object of this invention is to provide an improved diverting and control valve in which a regulated high capacity flow will be effectively controlled and a pilot flow measured for an indication of flow through the valve.

A still further object of this invention is to provide an improved pilot operated metering apparatus which may be used in a regulating or pilot operated function.

These and other objects of this invention will become apparent from a reading of the attached description together with the drawings wherein:

FIGURE 1 is an elevation view of the improved pilot operated metering apparatus with the valve portions in section, FIGURE 2 is a plan view of a second embodiment of the improved pilot operated metering apparatus, FIGURE 3 is an elevation view of the embodiment shown in FIGURE 2 with parts broken away, and FIGURE 4 is a sectional view of a portion of the embodiment of the pilot operated metering apparatus of FIGURES 2 and 3 in section.

In the embodiment shown in FIGURE 1, the improved pilot operated metering apparatus is shown as including a conventional control valve having a valve body shown in section and generally designated by the numeral 1. This control valve has inlet and outlet passages or ports 2 and 3, respectively, with a valve seat 4 mounted on a partition extending through the valve body and defining the main flow passage between the inlet and outlet ports. The valve seat is suitably mounted within the valve body, such as by threading and its seating surface 5 cooperates with a suitable seating surface on the movable valve closure member 6 or valve plug. The valve closure member 6 is generally cylindrical in form except for the circular and tapered seat cooperating flange thereon, identified at 6a. The valve plug 6 is mounted on or carried by a diaphragm 7 which is connected to the valve plug through a suitable bracket 7a with a diaphragm 7 being secured to the valve body 1 at a bonnet 9 secured to the valve body through suitable screw means. Diaphragm 7 defines with the bonnet 9 a pilot chamber 8 in which a control pressure operates on the diaphragm to adjustably position the valve plug or valve closure member 6 relative to the valve seat 4 to determine the opening of the control valve and hence the flow through the valve body 1. This degree of opening of the main valve is determined by the pressure applied to the lower surface of the valve plug including the circular tapered flange of the valve closure member acting against the pilot pressure within the chamber applied to the diaphragm 7. The pilot chamber communicates with the inlet side or port 2 of the valve body through a passage 10 in the valve closure member which passage is controlled by a small pilot valve formed by a stationary valve closure member 11 adjustably positioned in the valve body through suitable screw means 11a extending beyond the valve body. The sloped surfaces 12 on the pilot valve plug cooperate with the open extremity of the passageway 10 defining a seat on the lower extremity of the valve plug at the passageway 10 to form a divider valve and control a small metered flow through the main control valve, the measurement of which is to be effected, as will be later described.

Pilot chamber 8 in the valve body 1 has connected thereto a control passage or conduit 13 which in turn is connected to the inlet conduit 14 of a small flow type measuring device 16 mounted on the valve body 1 with a return conduit 15 from the measuring device 16 being connected to the outlet port 3 of the valve body. The flow type measuring device 16 is shown generally in FIGURE 1 and it may take many forms such as impeller type or gear type measuring apparatus, having a suitable rotating element therein connected to an indicating apparatus and/or recording apparatus shown generally at 17. This indicating and recording apparatus 17 may be of the water meter type.

In this improved diverting and measuring valve apparatus, the pressure drop through the meter portion 16 to the outlet side of the valve 3 will determine the pressure at the pilot chamber 8 which acts against the diaphragm having a larger effective area than the undersurface of the valve plug to provide a balanced condition and a given opening of the main control valve.

In the preferred embodiment, the improved diverting and measuring apparatus is shown as a regulating type valve with a measurement function. The pressure at the outlet side of the valve or port 3 will be determined by whatever type of fluid system the valve is connected with and its condition of operation to adjust the pressure level at the outlet side of the valve. This will adjust the pressure in the pilot chamber 8 in proportion to the pressure at the outlet side of the valve and provide for a given valve opening to maintain a flow therethrough, that is, across the valve seat 4 and from the inlet to the outlet ports 2 and 3 respectively in the valve body. The improved measurement apparatus does not require a large volume measuring device inasmuch as the diverting portion of the measuring apparatus defined by the valve plug 11 and the passage 10 in the valve closure member 6 will provide for a proportioned flow to the total flow through the control valve to be directed through the passage 10 which opens through the mounting bracket 7a into the pilot chamber 8 establishing a control pressure therein with flow continuing through the outlet passage 13 of the pilot chamber 8 and the inlet and outlet ports 14 and 15 of the metering device 16 back to the outlet side 3 of the main control valve. This minor flow through the metering device will be measured by the measuring apparatus, which is shown generally herein at 16 and may be a water recording and indicating type meter, to provide an indication of total flow through the valve body 1. The movement or operation of the main control valve, that is, the movement of the valve closure member or plug 6 relative to the valve seat 4 will simultaneously provide a proportioned opening through the pilot valve defined by the valve plug 11 which is tapered as at 12 or characterized to provide the pre-proportioned flow through the valve closure member 6 by way of its passage 10. This diverting valve may be adjusted or initially set by adjustably positioning the screw 11a mounting the valve plug 11 in the valve body 1 relative to the valve closure member 6. The indicating portion or meter 17 may be geared and calibrated to read directly in terms of the main flow through the valve body 1. In this embodiment, the variation in the pressure at the outlet side of the valve as controlled externally by the fluid system connected to the valve will adjust the degree of opening of the same to regulate the pressure at the outlet side of the valve and proportion the flow therethrough in accordance with the demand of the system. The improved diverting and measuring apparatus which may in addition record the total flow may be controlled externally and selectively independent of the system to which it is connected, as will be hereinafter defined.

In FIGURES 2, 3, and 4, a second embodiment of the improved diverting and measuring apparatus is shown. Since the main structure of the control valve including the body 1, the valve seat 4, the valve closure member 6 and the details of the diverting valve formed by the valve plug 11 and passage 10 in the valve closure member are identical with that of the preferred embodiment, these details are omitted herein for simplicity. Similarly, in the alternate embodiment, the control valve is diaphragm operated and utilizes the diaphragm 7 (not shown) which is held in position by the bonnet 9 to define the pilot chamber 8 therein. In this alternate embodiment, the outlet passage 13 from the pilot chamber in the bonnet is connected through a housing integrally formed with the bonnet 9 and containing the measuring section. Thus, as will be seen in FIGURES 2, 3, and 4, the outlet passage 13 of the pilot chamber extends through an inlet port 23 into a gear type flow measuring unit. Positioned at the inlet side of this measuring unit is a valve closure member 18 threadedly positioned in a bonnet cap 22 to adjustably control flow from the outlet of the pilot chamber 8 into the measuring unit. This measuring unit includes a positive displacement gear motor or sensor 16a of the measuring apparatus 16, which in turn is connected to a gearing section 21 having gears 21a therein driving the indicating apparatus 27. The outlet passage from the gear type flow measuring apparatus is shown at 24 leading through the modified bonnet 9 to a passage 25 formed in the valve body 1 adjacent the outlet 3 of the valve body. In this modified form, a particular type of flow sensing and measuring apparatus is shown, which measuring apparatus is rotated by the flow from a pilot chamber 8 past the control valve 18, which is manually adjustable for purposes to be later noted, and beyond the measuring gears 16a back to the outlet side of the control valve body 1. Rotation of the flow sensor or measuring apparatus is geared through the gear section 21 to the indicating apparatus 27 which may be calibrated in terms of flow through the main control valve. In this embodiment, the flow from the pilot chamber is again returned to the outlet side of the main control valve through the intermediate valve 18. Valve 18 is manually adjustable and may be used to throttle or initiate operation of the control valve by adjustably controlling the pressure in the pilot chamber 8. This manually adjusted valve 18 may also be remotely controlled electrically or hydraulically and be independent of the operation of the main control valve. In this type of system, the variation of the pressure at the outlet side of the valve will be reflected into the operation of the control valve 18. The independent control by valve 18 may be used for initiation of the operation of the main control valve or modification of the operation of the same.

While I have shown a particular type of measuring apparatus and control valve, it will be understood that this apparatus may take varying forms within the scope of the invention. Thus I wish to be limited only by the appended claims.

I claim:

1. A flow divider and measuring apparatus comprising, a valve body having inlet and outlet ports therein with the flow passage connecting said ports, a control valve including a valve seat positioned in said flow passage, a valve closure member for said control valve cooperating with said valve seat to control flow through said flow passage, a diaphragm mounted in said valve body and connected to said valve closure member for positioning the same relative to said valve seat, said diaphragm cooperating with said valve body to define a pilot chamber remote from said flow passage, a flow measuring device connected to said pilot chamber, a pilot passage in said valve closure member connected to said pilot chamber, a pilot valve having a valve seat formed as a portion of said pilot passage in said valve closure member and a tapered pilot valve plug positioned within said valve body and cooperating with the seat portion of said pilot passage, said pilot valve being operative with operation of the control valve and having a flow therethrough in proportion to the flow through said control valve, said control valve being operated by a variation in pressure in the pilot chamber acting on said diaphragm to counteract the force on the underside of the valve closure member and to control the degree of opening of the control valve.

2. The flow dividing and measuring valve of claim 1 and including guide means positioned in said valve body and cooperating with the valve closure member to guide the movement of the same.

3. The flow dividing and measuring valve of claim 2 in which the guide means is mounted in part in the pilot chamber and cooperates with a guide bracket attached to said valve closure member with said guide means movable in said pilot passage.

4. The flow dividing and measuring valve of claim 2 in which the flow measuring device has indicator means attached thereto.

5. The flow dividing and measuring valve of claim 1 in which the flow measuring device is of the gear type and is connected at one extremity to the pilot chamber and at the other extremity to the outlet of said control valve.

6. The flow dividing and measuring apparatus of claim 1 and including recorder means attached to the flow measuring device and controlled thereby.

7. The flow dividing and measuring valve of claim 1 and including a manually adjustable secondary control valve positioned within the flow measuring device and controlling flow through the pilot passage with the pilot valve.

8. The flow dividing and measuring valve of claim 1 in which the control of flow through the control valve is determined by the pressure at the outlet port of said valve body connected to the pilot chamber above the diaphragm.

9. The flow dividing and measuring valve of claim 1 in which the flow through the pilot valve is modulated and proportional to the flow through the control valve.

10. A pilot operated indicating apparatus comprising, a main control valve having an inlet and an outlet with a valve seat therebetween and a valve closure member cooperating therewith to control a main flow through the apparatus, a passage in the valve closure member of the main control valve, a pilot divider valve including in part the passage in the main control valve and controlling a pilot flow from the main flow through the passage in the main control valve, said pilot divider valve being controlled by the relationship between the valve closure member and the valve seat of the main control valve and operated in proportion to the operation of the main control valve, means including conduit means connecting the outlet of the main control valve and the passage in the main control valve and responsive to the pressure at the outlet of the main control valve to operate the main control valve and effect control of the main flow therethrough, an indicator means positioned in the conduit means and operated in accordance with the pilot flow through the passage in the main control valve.

11. The pilot operated indicating apparatus of claim 10 in which the means responsive to the pressure at the outlet of the main control valve is a diaphragm connected to the valve closure member of the main control valve and operating the same in proportion to the pressure at the outlet of the main control valve.

12. The pilot operated indicating apparatus of claim 11 in which the pilot divider valve is operated with the main control valve and has flow characteristics to control flow in the passage in the valve closure member in proportion to flow through the main control valve.

13. The pilot operated indicating apparatus of claim 12 and including additional valve means positioned in the conduit means and controlling in part the flow to the indicator means and adapted to initiate operation of the main control valve.

14. The pilot operated indicating apparatus of claim 13 in which the additional valve means is a manually operated valve.

References Cited by the Examiner

UNITED STATES PATENTS

| | | | |
|---|---|---|---|
| 336,147 | 2/1886 | Nash | 73—203 |
| 638,791 | 12/1899 | Wylie | 73—203 |
| 2,328,010 | 8/1943 | Griswold | 137—496 |

WILLIAM F. O'DEA, *Primary Examiner.*

D. MATTHEWS, *Assistant Examiner.*